(No Model.)  3 Sheets—Sheet 2.

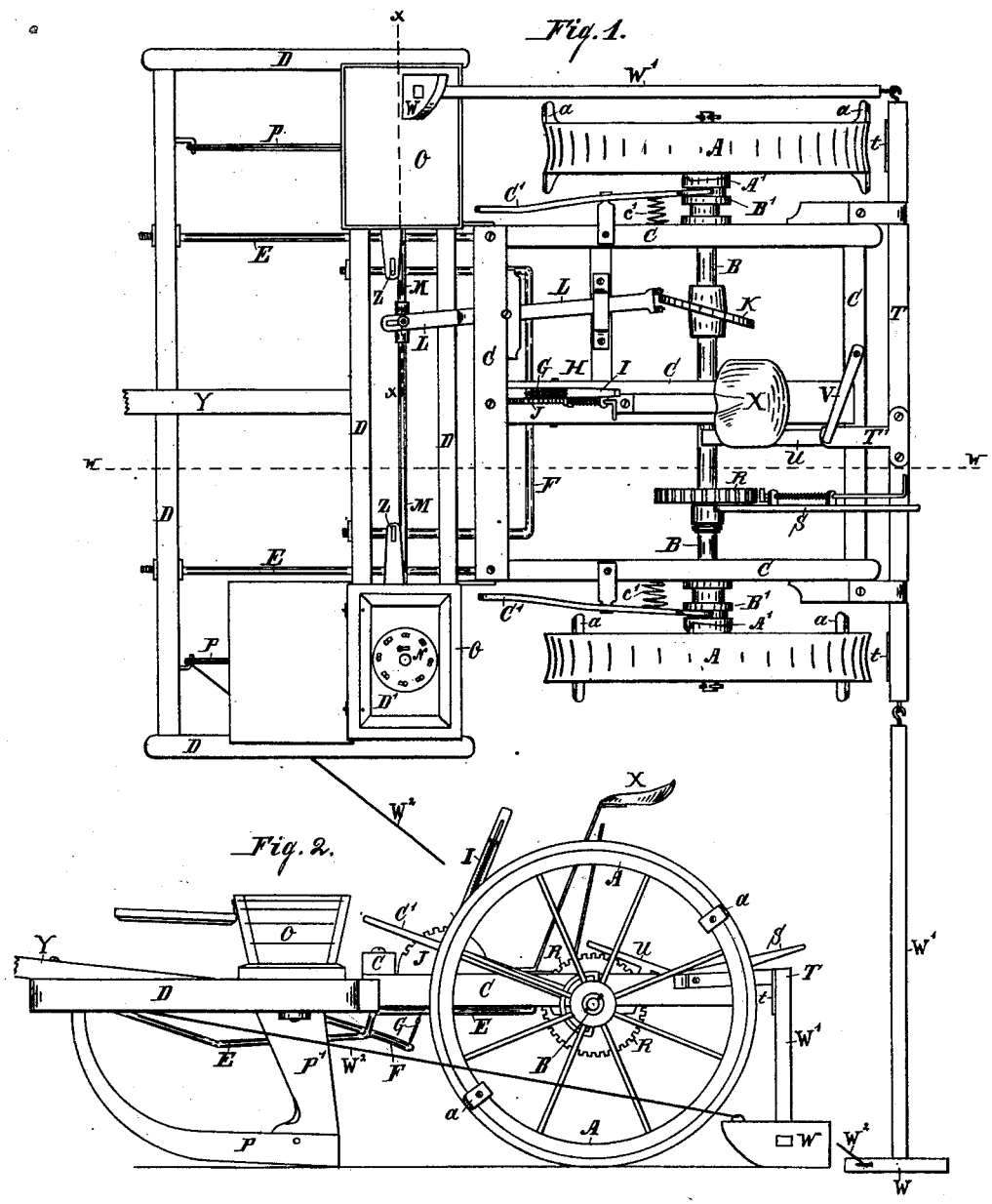

T. J. SIDENER.
Corn Planter.

No. 242,063.  Patented May 24, 1881.

WITNESSES.
James B. Lizius.
R. P. Daggett.

INVENTOR.
Thomas J. Sidener,
per C. Bradford
ATTORNEY.

(No Model.) 3 Sheets—Sheet 3.
T. J. SIDENER.
Corn Planter.
No. 242,063. Patented May 24, 1881.
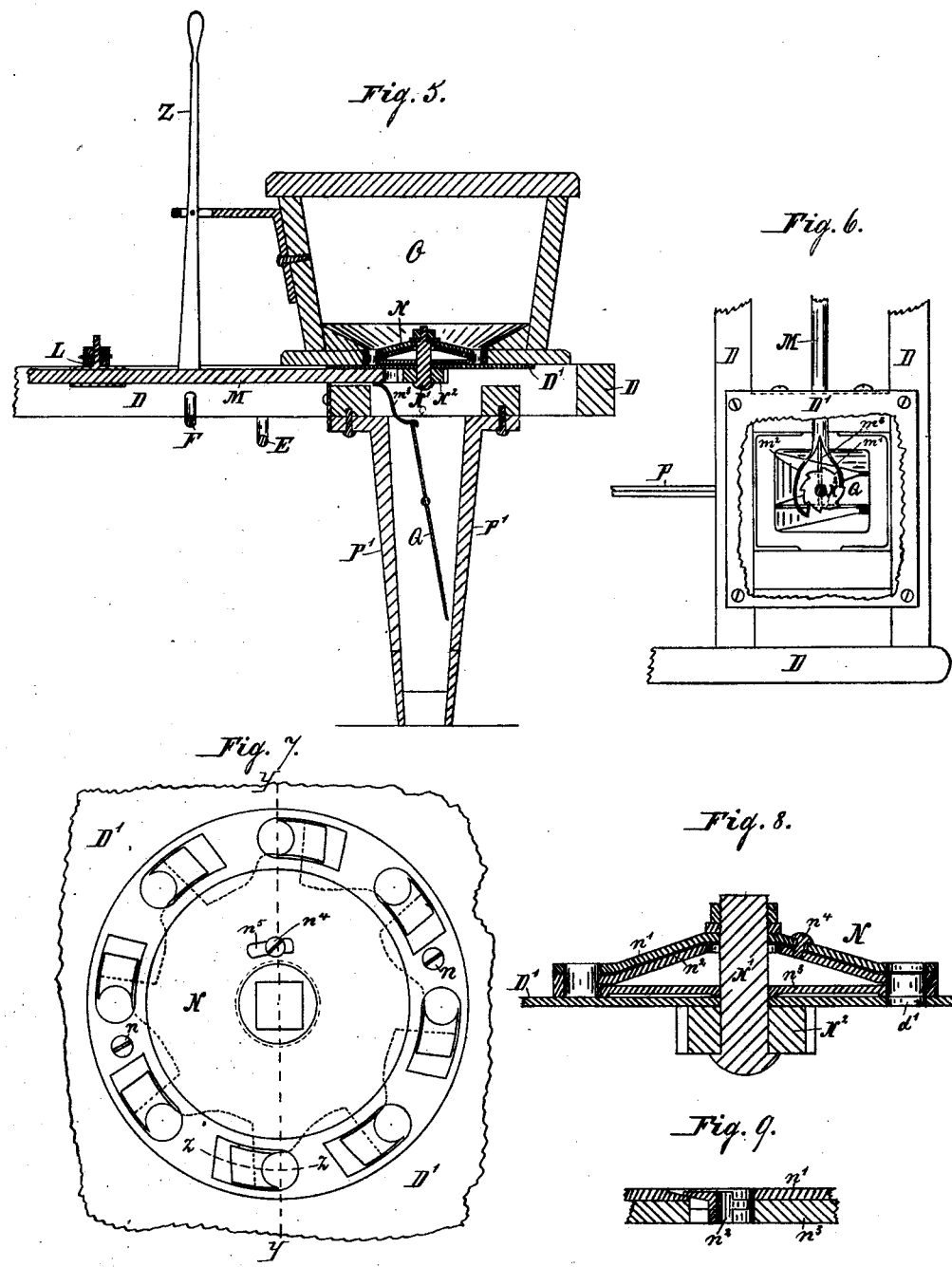

UNITED STATES PATENT OFFICE.

THOMAS J. SIDENER, OF BROWN TOWNSHIP, MONTGOMERY COUNTY, ASSIGNOR OF ONE-HALF TO WILLIAM R. FRY, OF CRAWFORDSVILLE, IND.

CORN-PLANTER.

SPECIFICATION forming part of Letters Patent No. 242,063, dated May 24, 1881.

Application filed July 23, 1880. (No model.)

*To all whom it may concern:*

Be it known that I, THOMAS J. SIDENER, of Brown township, in the county of Montgomery and State of Indiana, have invented certain new and useful Improvements in Corn-Planters, of which the following is a specification.

My invention consists in several improvements in the construction and arrangement of parts of a machine for planting corn and other grain, whereby certain advantages of operation are attained, as will hereinafter be more fully set forth.

Figure 3:
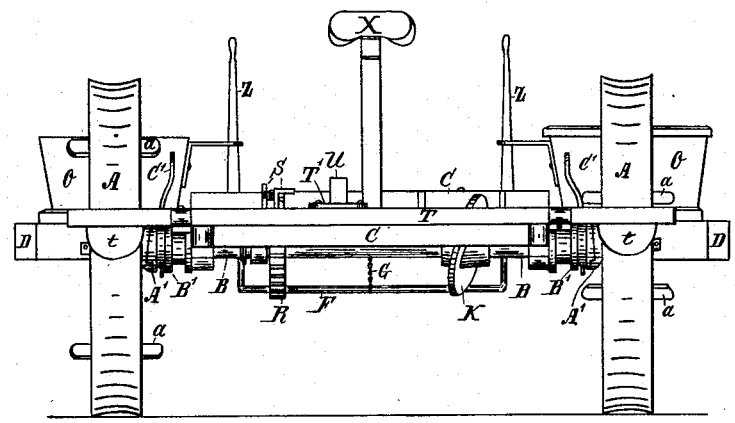
Figure 4:
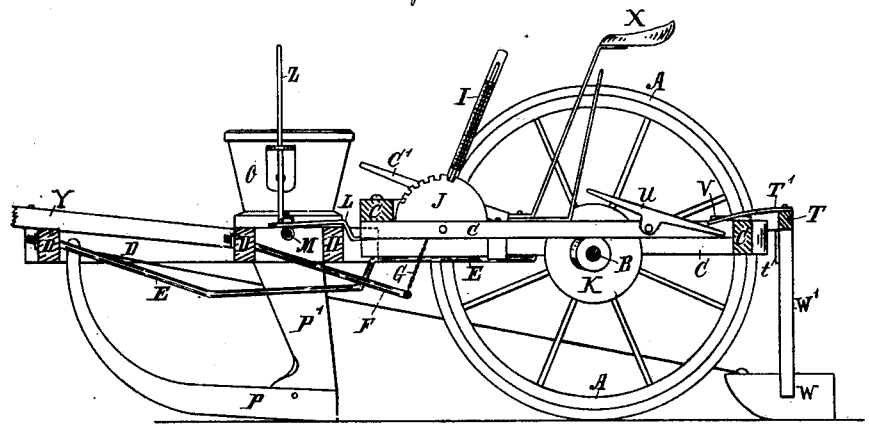

Referring to the accompanying drawings, which are made a part hereof, Figure 1 is a top or plan view of a corn-planter embodying my improvements; Fig. 2, a side elevation thereof; Fig. 3, a rear elevation; Fig. 4, a longitudinal vertical section on the dotted line $w\,w$; Fig. 5, an enlarged section on the dotted line $x\,x$; Fig. 6, a horizontal detail plan of the gearing that operates the seed-dropping plate, the parts above being removed or broken away. Fig. 7 is a separate plan of the seed-dropping plate still more enlarged. Fig. 8 is a transverse vertical section on the dotted line $y\,y$ in Fig. 7, and Fig. 9 is a detail section of the seed-dropping plate on the dotted line $z\,z$.

In said drawings the portions marked A are the wheels of the planter; B, the axle thereto; C, a frame-work mounted on the axle B; D, a second frame-work in front of the frame-work C; E, rods connecting the two frames C and D together; F, G, H, and I, respectively, a bar, chain, wheel, and lever, by means of which the relative heights of the two frames at the point where they are nearest each other are adjusted; J, a rack with which a pawl or latch on the lever I engages, thus making the adjustment permanent until purposely changed; K, a cam fixedly mounted on the shaft B; L, a lever-shaft, which is driven by the cam-wheel K; M, a reciprocating rod, to which motion is imparted by the lever L, and which actuates the seed-dropping plates; N, the seed-dropping-plates, composed each of three disks, $n'$ $n^2$ $n^3$, and provided with a central shaft, N', having a ratchet-wheel, N², on its lower end, with which the reciprocating rod M engages; O, the seed-boxes; P, the runners having the usual hollow shanks, P'; Q, vibrating plates inside the shanks of the runners, to regulate the dropping of the seed; R, a ratchet-wheel on the shaft B, by which, with the aid of a latch-lever, S, said shaft is turned in proper position for starting; T, a bar hinged to the rear part of the frame-work C, and provided with scrapers $t\,t$ to keep the wheels free from dirt; U, a lever by which, through the arm T', said bar and scrapers are operated; V, a spring, by means of which the scrapers are kept away from the wheels, except when purposely thrown in contact therewith; W, markers on the ends of hinged arms W', for the purpose of marking upon one trip the proper track for the wheel upon its next trip; X, a suitable seat for the operator; Y, the tongue or pole of the planter, and Z hand-levers, which may be used to operate the reciprocating rod M in cases when, for any reason, it is undesirable to employ the hereinbefore-described means for that purpose.

It is important that the wheels should freely revolve on the axle while the planter is being driven from one place to another; but they must necessarily drive the axle, and thus, through the cam K, operate the seed-dropping mechanism when the planter is in use. The clutch A' B' is therefore provided. The part A' is rigidly attached to the wheel A, and the part B' is so mounted on the axle B that while it rotates therewith it will slide endwise thereon, and is thus adapted to be thrown into or out of engagement with the part A'. A lever, C', attached to the frame C, enables this to be readily and easily accomplished, while a spring, $c'$, keeps the parts at all times engaged, except when force is applied to said lever. It is very desirable in the construction of this clutch that some means should be provided whereby, when the clutch is brought into engagement, the wheels shall automatically be "brought into check". This I accomplish by constructing the clutches with only two teeth or notches each, and mounting them so that said teeth or notches and the markers $a\,a$ on said wheels shall be in the same relation on both sides of the planter. There being no more notches in the clutches than markers on the wheels, it is impossible that the latter should ever be "out of check" with each other when the machine is in operation unless the former are wrongly mounted.

The lugs $a$ on the wheels A are for the purpose of marking the position of the hills, and it is desirable that these hills should range in rows as well transversely of the track of the planter as along said track. In order that these lugs may conveniently be brought in line with the marks left thereby on the preceding trip the rigidly-mounted ratchet-wheel R and the loosely-mounted latch-lever S are placed upon the axle B. By means of these the operator is enabled to easily set the wheels, and consequently the lugs thereon, in any desired position.

In fields where there is clayey or sticky soil the wheels often get clogged by the adhesion of the earth thereto. I have provided a simple and convenient means of cleaning them in the scrapers $t\,t$, which are attached to the hinge-mounted bar T. By simply pressing with his foot upon the lever U the operator throws these scrapers in contact with the wheels, and they are thus quickly and effectually cleaned. The spring V, as before stated, keeps the scrapers away from the wheels at all other times.

It is desirable that in some cases the seed should be planted deeper than in others. To this end the forward frame, which carries the runners and seed-dropping mechanism, is formed separately from the frame which is supported by the wheels, and is adapted to be raised or lowered by means of the chain G, wheel H, and accompanying mechanism. The raising of the rear end of the forward frame in this manner prevents the runner from entering the ground too deeply, and the seeds are consequently planted at less depth than would otherwise be the case, while the lowering of said portion produces the opposite result.

The seed-dropping plate N is composed, as before stated, of three disks, $n'\,n^2\,n^3$. The upper and lower of these disks are connected together, usually by bolts $n\,n$, and the openings therein are in such relation as to allow an uninterrupted passage of the seeds through both. The central disk, $n^2$, is of somewhat less diameter than the others, so as to be entirely contained in the space between them, and is made adjustable by means of a set-screw, $n^4$, which enters it through a slot, $n^5$, in the plate $n'$. It is provided with wings, which enter and partially fill the openings in the other disks, and are adapted to increase or diminish the size of said openings as the disk is moved back and forth by the set-screw adjustment. These openings are for the purpose of holding the seed to be dropped in each hill, and therefore this adjusting the size of the openings determines the quantity of seed to be planted.

I am aware that seed-dropping plates have been constructed of two disks each; but the addition of a third disk in a plate of this character is an advantage in that the central or adjustable one is thereby protected from any contact with the stationary plate over which this plate moves, or any other part of the mechanism, and the danger of its becoming loosened and moved out of proper adjustment while in use, thereby destroying the accuracy of the "feed," is thus prevented.

The plate N is rotated by means of the reciprocating rod M and the ratchet-wheel $N^2$. The plate D', which is rigidly attached to the frame D, forms a bearing for the shaft N', upon which the ratchet-wheel $N^2$ and plate N are mounted. Said plate D' has an orifice, $d'$, which is located at the same distance from the shaft as the seed-receiving openings in the rotating plate N. The reciprocating rod M is divided at its ends, as shown, and one branch, $m'$, operates to push against the cogs on one side of the wheel $N^2$ and forces one of the openings in the plate N over and past the orifice $d'$ in the plate D', the openings in the plate N being filled with grains of seed, which are discharged in their passage through the orifice $d'$ into the hollow shank $p'$ of the runner P. The other branch, $m^2$, of the rod M is hooked, and operates to pull on the other side of the ratchet-wheel, and thus repeat the operation just described. The seed, after it falls through the orifice $d'$, is held by the vibrating plate Q until the reverse motion of the rod M commences, which, through the small rod $m^3$, operates to move said plate and release said seed, which then falls into the ground and is covered by the action of the runner P and wheel A.

In order that the rows shall be exactly the same distance apart, I employ a runner, W, mounted on a stiff arm, W', which is of the same length as the distance between the wheels. This arm is suitably jointed to some portion of the rear frame-work, and the runner is secured by a cord, $W^2$, to the forward frame-work when in use, in the manner shown. This arrangement of devices forms a convenient and effective marker for the purpose. When not in use the arm and runner are folded upon the seed-box, as shown upon the upper side of Fig. 1. As each side of the machine is provided with one of these markers the track can be marked in going in either direction across the field.

Whenever, for any reason, it becomes undesirable to drive the seed-dropping mechanism, as hereinbefore described, the lever L can be disconnected and the rod M operated by hand, through one of the levers Z, by a person who may be seated on the seed-box.

Having thus fully described my said invention, what I claim as new, and desire to secure by Letters Patent, is—

1. The combination, with the two wheels of a corn-planter, each provided with markers rigidly affixed thereto, of the two-part clutches A' B', each of which is provided with a number of notches exactly corresponding to the number of markers on the wheels, substantially as and for the purposes set forth.

2. In combination with the wheels of a corn-planter, each having two markers, a a, and the axle B, the two-part clutches A' B', each of which is provided with two notches only, to correspond with the two markers on the wheels, so that the corresponding ones of the latter on the two wheels shall be always brought into check with each other when in use, substantially as shown and specified.

3. In a corn-planter, the seed-dropping plate N, consisting of the three disks $n'$ $n^2$ $n^3$, the central one of which is adjustable, as specified, and is protected from coming in contact with or being loosened or moved by any other part of the mechanism by the others, substantially as shown and set forth.

4. In a corn-planter, the combination of the stationary plate D', having the orifice $d'$, the rotary plate N, composed of three disks, $n'$ $n^2$ $n^3$, the central one of which, $n^2$, can be adjusted so as to increase or diminish the orifices therein through which the seed passes, which orifices pass at intervals over the orifice $d'$, the shaft N', having a bearing in the plate D', the ratchet-wheel $N^2$, and devices for periodically operating the same, all constructed, arranged, and operating substantially as set forth.

5. In a corn-planter, the combination of the wheels A A, provided with markers $a$ $a$ and clutch parts A' A', the axle B, having clutch parts B' B', the levers C' C' for operating the clutch parts B' B', the cog-wheel R, the loosely-mounted latch-lever S, the cam K, the bar L, the rod M, and the rotary seed-dropping plates N N, all constructed, arranged, and operating substantially as set forth.

In witness whereof I have hereunto set my hand and seal, at Indianapolis, Indiana, this 5th day of July, A. D. 1880.

THOMAS J. SIDENER. [L. S.]

In presence of—
C. BRADFORD,
NATHAN H. LONG.